R. H. VERGE.
COMBINED ROLLER AND STALK CUTTER.
APPLICATION FILED NOV. 13, 1915.
1,176,626.
Patented Mar. 21, 1916.
3 SHEETS—SHEET 2.
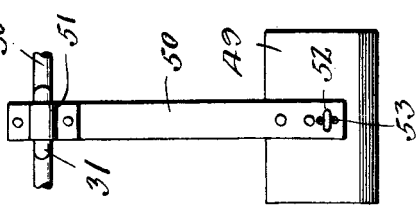
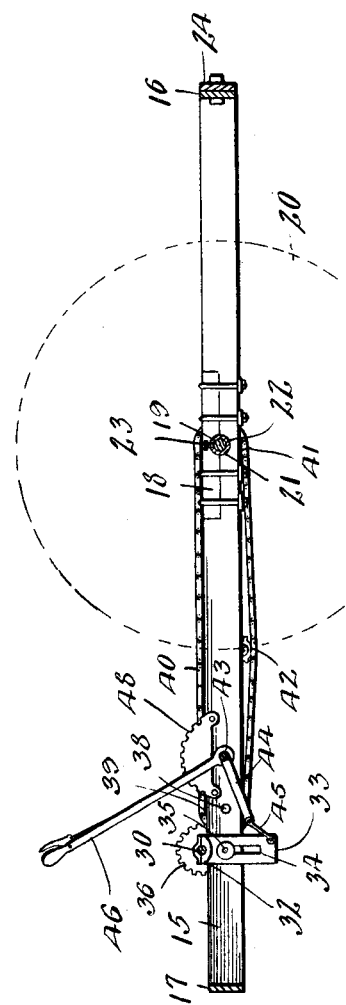
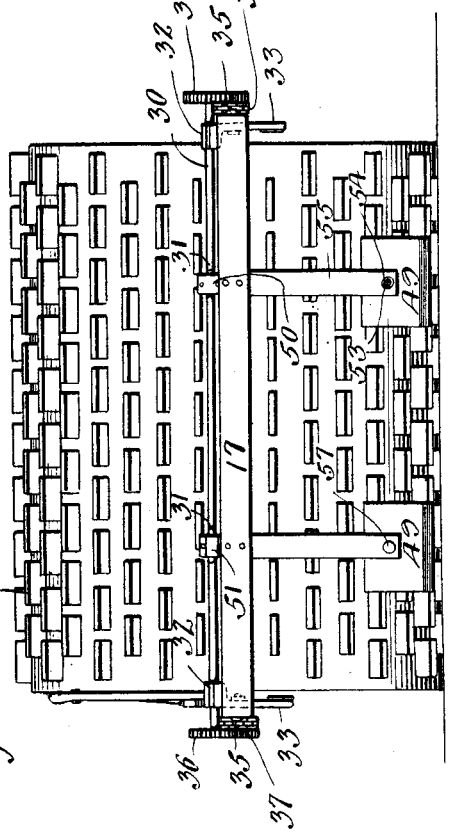
Inventor
R. H. Verge,
Witnesses
By Victor J. Evans
Attorney R. H. VERGE.
COMBINED ROLLER AND STALK CUTTER.
APPLICATION FILED NOV. 13, 1915.
1,176,626.
Patented Mar. 21, 1916.
3 SHEETS—SHEET 3.
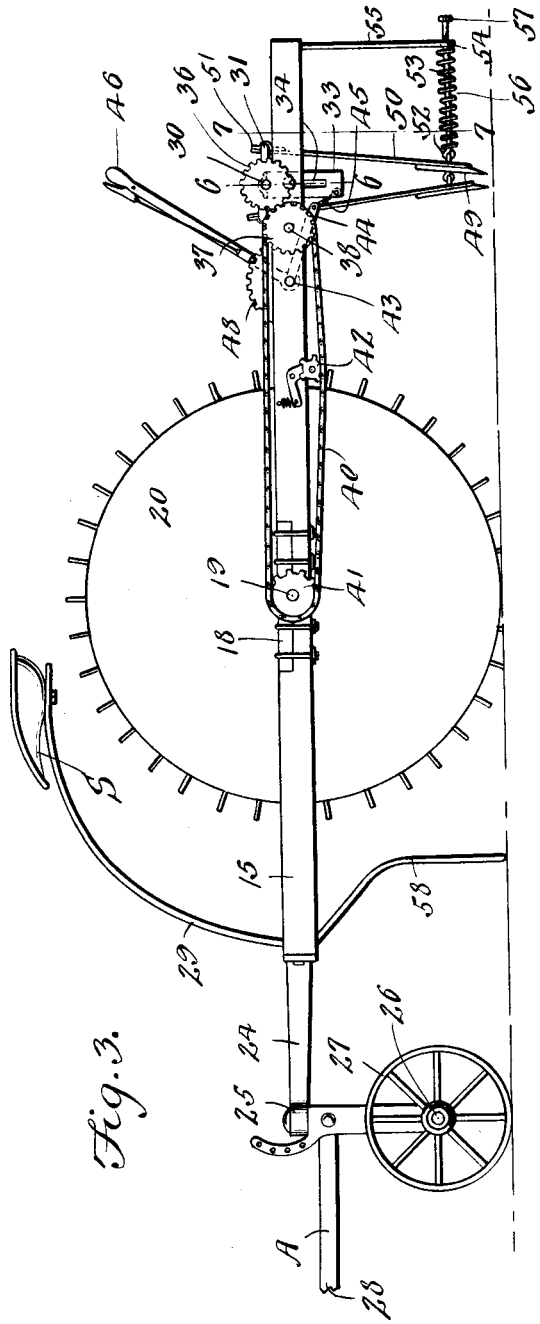
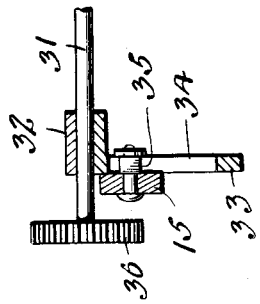
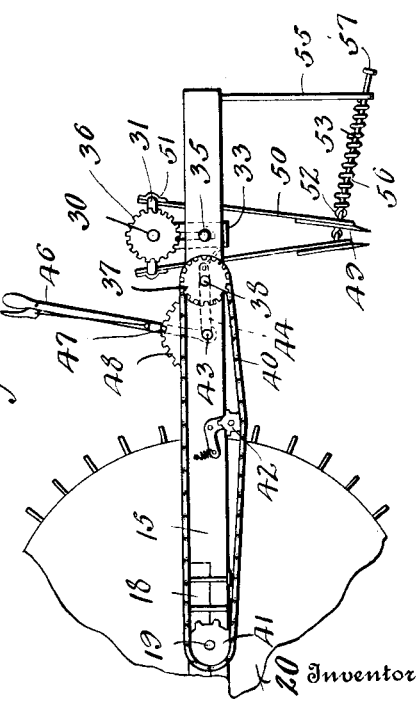
Inventor
R. H. Verge,
By Victor J. Evans
Attorney
Witnesses

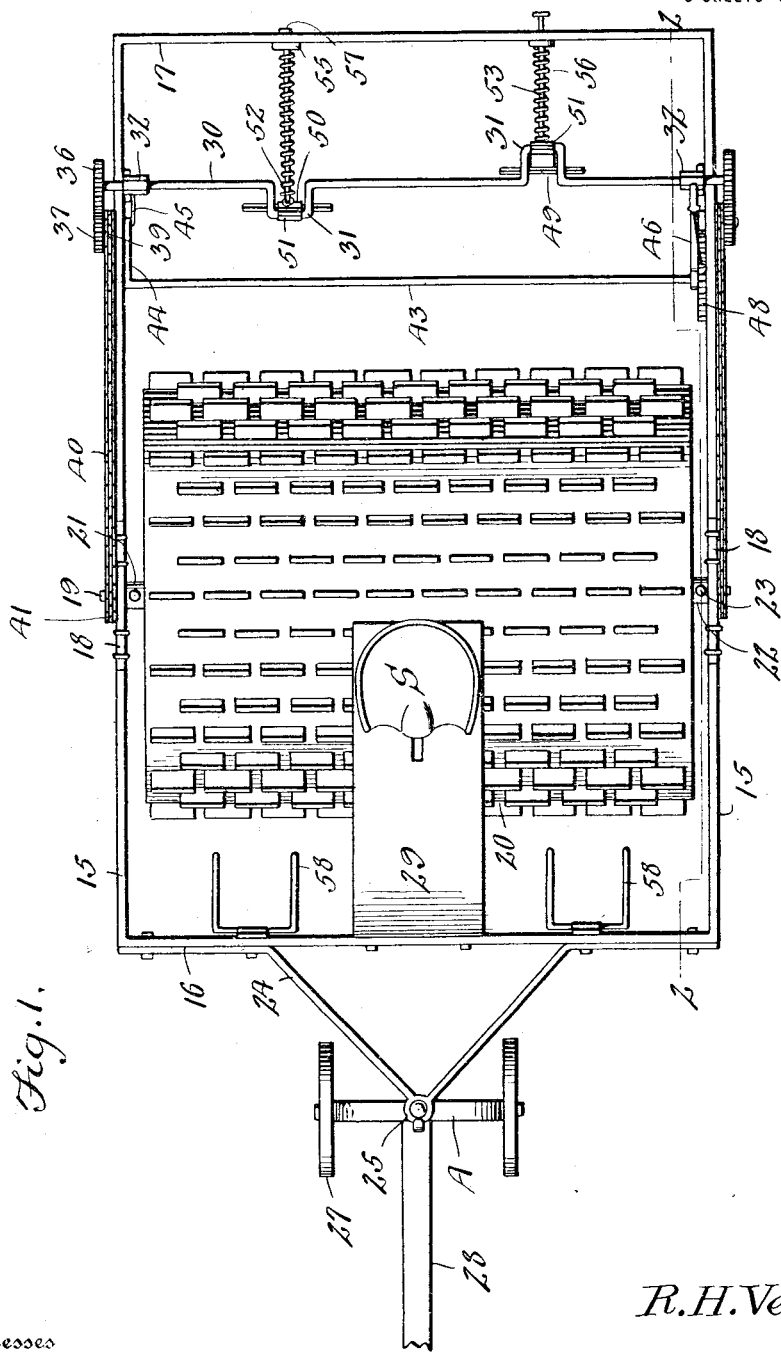

UNITED STATES PATENT OFFICE.

ROY H. VERGE, OF VICTORIA, ILLINOIS.

COMBINED ROLLER AND STALK-CUTTER.

1,176,626.   Specification of Letters Patent.   Patented Mar. 21, 1916.

Application filed November 13, 1915. Serial No. 61,294.

*To all whom it may concern:*

Be it known that I, ROY H. VERGE, a citizen of the United States, residing at Victoria, in the county of Knox and State of Illinois, have invented new and useful Improvements in Combined Rollers and Stalk-Cutters, of which the following is a specification.

This invention relates to an improved machine for breaking down corn stalks and the like and for chopping such stalks into short pieces which may be easily plowed under for the purpose of enriching the soil.

The present invention has for its object to produce an improved machine of the class described embodying a roller whereby the stalks will be crushed down, and reciprocatory knives or cutters deriving motion from the roller and whereby the stalks will be chopped into small pieces.

A further object of the invention is to produce a machine of the class described having simple and improved means for transmitting motion from the roller to the stalk cutting devices and means whereby such transmission may be thrown out of gear, the stalk chopping devices being at the same time lifted clear of the ground for convenience in transporting the machine from place to place.

A further object of the invention is to provide simple and improved means whereby such stalks as become prostrated or beaten down so as to lie transversely in the path of the machine will be straightened to a lengthwise position so as to be successfully operated upon by the chopping devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a longitudinal sectional view taken on the line 2—2 in Fig. 1. Fig. 3 is a side elevation. Fig. 4 is a rear elevation. Fig. 5 is a detail view in side elevation showing the cutting devices raised to an inoperative position. Fig. 6 is a transverse sectional detail view taken on the line 6—6 in Fig. 3. Fig. 7 is a transverse sectional detail view taken on the line 7—7 in Fig. 3.

Corresponding parts in the several figures are denoted by like characters of reference.

The frame of the improved machine is of rectangular form comprising the side beams 15, the front bar 16 and the rear bar 17. Mounted on the side beams 15 are the boxes or bearings 18 in which the axle or main shaft 19 is supported for rotation. The roller 20 has a tubular boxing 21, the ends of which project beyond the end faces of the roller so as to form collars 22 having set screws 23 which may be tightened on the axle 19 so that the latter will be caused to revolve in its bearings when the roller is rotated.

Connected with the front frame bar 16 is a draft bar 24 having a loop 25 with which a tongue truck A is connected, said tongue truck embodying an axle 26 having wheels 27 and supporting a tongue 28 to which the draft animals may be attached, thereby relieving the necks of the draft animals of the weight of the roller frame. The front bar of said frame also carries the seat support 29 on which the seat S for the driver or operator is mounted in the customary manner.

A shaft 30 having cranks 31 formed thereon is supported for rotation in boxes or bearings 32 at the upper ends of slides 33 which are fitted for vertical movement on the inner faces of the frame bars 15, to the rearward of the roller 20, each of said slides being provided with a vertical slot 34 for the passage of a guide or securing member 35, such as a bolt having a shoulder or portion of rectangular cross section to engage the slot 34 in order that the slide 33 may be prevented from tilting about the axis of such securing member. Other well known means may, however, be employed for the purpose of properly guiding the slides. The slides 33 will normally gravitate downwardly carrying the crank shaft, which latter is provided at the ends thereof with pinions 36 meshing with cog wheels 37 that are mounted for rotation on stub shafts 38 on the side members of the frame. The cog wheels 37 have sprocket wheels 39 formed integrally therewith, said sprocket wheels being connected by means of chains 40 with sprocket wheels 41 that are fixed on the ends of the axle 19, thereby causing motion to be transmitted, when the machine is in operation, from the axle 19 to the combined sprocket and cog wheels, and from the latter through the medium of the pinions 36 to the crank shaft, assuming that the slides carrying said crank shaft have gravitated downwardly sufficiently far to place the pinions 36 in mesh with the cog wheels 37. The transmission chains 40 are normally kept taut by means of chain tighteners 42 of well known construction.

A rock shaft 43 which is supported for rotation on the side bars 15 of the frame and which extends transversely across the latter is provided with arms 44, said arms being connected by means of links 45 with the slides 33. For the purpose of actuating the rock shaft 43 a hand lever 46 is provided, said lever extending upwardly from the rock shaft with which it is securely connected, and said lever being equipped with a spring-actuated stop member 47 engaging a segment rack 48, whereby the lever, the rock shaft and related parts may be held securely at various adjustments.

The cutting devices of the improved machine consist of knives or blades 49, the same being carried by shanks 50, each of which has a boxing 51 engaging a crank 31 on the shaft 30. Connected with each shank 50 by means of interengaging eyes 52 is a guide rod 53, said guide rod extending through an aperture 54 in a bracket 55 connected with and extending downwardly from the rear cross bar 17 of the frame. A spring 56 is coiled about the guide rod 53, whereby the cutter carrying shank 50 is normally forced in a forward direction, the forward movement being limited by a stop member 57 on the guide rod 53. Any desired number of cutting devices and related parts may be provided, so that several rows of corn stalks may be simultaneously operated upon. The machine illustrated in the drawings is of a capacity to operate on two rows of stalks, but no limitation is intended in this respect.

Connected with the front cross bar of the frame are rearwardly extending obliquely disposed ground engaging members 58 which I term "stalk hooks" and which in the operation of the machine serve to pull into line such down stalks as may lie on the ground transversely with respect to the machine, such stalks being by the action of the hooks straightened out to a position that will enable them to be successfully operated upon by the cutting devices.

In the operation of the machine it is drawn over the field, the roller serving to beat down and to crush the corn stalks which are also by the action of the stalk hooks disposed in straight lines. The cutter carrying shanks which are actuated by the crank shaft will be reciprocated vertically, and will cut or chop the stalks into short pieces, the length of which may obviously be governed by properly proportioning the cog wheels 37 and the pinions 36, thereby regulating the frequency of operation of the cutters. If obstructions should be encountered by the cutters, said cutters will be free to yield in a rearward direction, the rods 53 being forced rearwardly against the tension of the springs 56, which latter, the obstructions having been passed, will instantly restore the cutters to their normal position. To interrupt the operation of the cutters and to lift the latter clear of the ground for convenience in moving the machine from place to place, the rock shaft 43 is actuated by the hand lever with which it is provided, the arms 44 and link connections 45 serving to lift the slides 33 carrying the boxes in which the crank shaft is supported for rotation, and the parts being retained in adjusted position by engagement of the stop member 47 with the rack segment 48.

As will be seen, I have produced a simple and effective machine by means of which corn stalks, cotton stalks and the like may be crushed and beaten down and subsequently cut into small pieces which may be conveniently plowed under, thus enriching the soil and speedily placing it in condition for new crops.

Having thus described the invention what is claimed as new, is:—

1. In a machine of the class described, a frame, a roller carrying axle revolubly mounted on the frame, sprocket wheels mounted on the ends of the axle, combined sprocket wheels and cog wheels supported for rotation exteriorly on the side members of the frame, transmission chains connecting the sprocket wheels on the axle with the sprocket members of the combined sprocket wheels and cog wheels, slides guided for vertical movement on the inner faces of the side members of the frame and having boxes at their upper ends, a crank shaft journaled in said boxes, said crank shaft having pinions meshing with the gear members of the combined gear wheels and sprocket wheels, and cutting devices carried and actuated by the crank shaft.

2. In a machine of the class described, a frame, a roller carrying axle revolubly mounted on the frame, sprocket wheels mounted on the ends of the axle, combined sprocket wheels and cog wheels supported for rotation exteriorly on the side members of the frame, transmission chains connecting the sprocket wheels on the axle with the sprocket members of the combined sprocket wheels and cog wheels, slides guided for vertical movement on the inner faces of the side members of the frame and having boxes at their upper ends, a crank shaft journaled in said boxes, said crank shaft having pinions meshing with the gear members of the combined gear wheels and sprocket wheels, and cutting devices carried and actuated by the crank shaft; in combination with a rock shaft journaled on the frame and having radial arms, links connecting said arms with the slides, and means for actuating the rock shaft to elevate the slides, thereby placing the pinions carried by the crank shaft out of mesh with the mating gears.

3. In a machine of the class described, a traveling frame, a crank shaft supported for rotation, vertically movable supporting means for the crank shaft, means for driving the crank shaft when the supporting means are lowered and for interrupting the motion of the crank shaft when its supporting means are elevated, a cutter carrying shank having a boxing engaging a crank on the shaft, a bracket depending from the frame, a guide rod connected with the cutter carrying shank and guided through the bracket, and a spring surrounding the guide rod and pressing against the cutter carrying shank to force the latter in a forward direction.

4. In a machine of the class described, a traveling frame, a crank shaft supported for rotation, vertically movable supporting means for the crank shaft, means for driving the crank shaft when the supporting means are lowered and for interrupting the motion of the crank shaft when its supporting means are elevated, a cutter carrying shank having a boxing engaging a crank on the shaft, a bracket depending from the frame, a guide rod connected with the cutter carrying shank and guided through the bracket, and a spring surrounding the guide rod and pressing against the cutter carrying shank to force the latter in a forward direction, the guide rod being provided with a stop member to limit the forward movement of the cutter carrying shank.

In testimony whereof I affix my signature in presence of two witnesses.

ROY H. VERGE.

Witnesses:
JOHN P. CLARK,
GEORGE S. WESTFALL.

Copies of this patent may be obtained for five cents each, by addressing the "Commissioner of Patents, Washington, D. C."